United States Patent [19]
Chessin et al.

[11] Patent Number: 6,026,242
[45] Date of Patent: Feb. 15, 2000

[54] METHODS, COMPUTER PROGRAM PRODUCTS, AND APPARATUS FOR INITIALIZING GLOBAL REGISTERS

[75] Inventors: Stephen Alan Chessin, Mountain View; Rodrick Ison Evans, Menlo Park; Michael S. Walker, Los Altos, all of Calif.

[73] Assignee: Sun Microsystems, Inc., Palo Alto, Calif.

[21] Appl. No.: 09/087,344

[22] Filed: May 29, 1998

[51] Int. Cl.[7] .................................................. G06F 9/45
[52] U.S. Cl. ................ 395/709; 364/232.23; 364/280.4; 364/280.5
[58] Field of Search ..................... 395/705, 709, 395/707

[56] References Cited

U.S. PATENT DOCUMENTS

| | | | |
|---|---|---|---|
| 4,435,753 | 3/1984 | Rizzi ........................................ | 364/709 |
| 5,339,428 | 8/1994 | Burmeister et al. ..................... | 395/707 |
| 5,339,431 | 8/1994 | Rupp et al. ............................. | 395/710 |
| 5,367,651 | 11/1994 | Smith et al. ............................ | 395/709 |
| 5,375,242 | 12/1994 | Kumar et al. ........................... | 395/707 |
| 5,428,793 | 6/1995 | Odnert et al. ........................... | 395/709 |
| 5,481,708 | 1/1996 | Kukol ..................................... | 395/709 |
| 5,535,391 | 7/1996 | Hejlsberg et al. ....................... | 395/709 |
| 5,555,417 | 9/1996 | Odnert et al. ........................... | 395/707 |
| 5,564,031 | 10/1996 | Amerson et al. ....................... | 711/209 |
| 5,613,120 | 3/1997 | Palay et al. ............................. | 395/710 |
| 5,680,622 | 10/1997 | Even ....................................... | 395/709 |

OTHER PUBLICATIONS

Aho, Alfred V; Sethi, R; Ullman, J. "Compilers, Principles, Techniques, and Tools". Reading, MA. Addison–Wesley. Chapter 9, Section 9.7, and chapter 12, sections 12.4–12.6, Dec. 1985.

*Primary Examiner*—Eric W. Stamber
*Assistant Examiner*—Kelvin E. Booker
*Attorney, Agent, or Firm*—Sabath & Truong; Robert P. Sabath; Stanley N. Protigal

[57] ABSTRACT

A system, method and computer program product for compiling a source file and to generate a data structure associating a global symbol with a global register referenced in the source file. The data structure enables a linker to initialize the global registers. The compiler also generates an object file from the source file. The object file includes the global register information. A linker links the object file potentially with at least one other object file or shared library to thereby generate an executable file or shared library. The linker uses the global symbol information contained in the object file to initialize the global registers and to perform relocation operations.

20 Claims, 12 Drawing Sheets

OBJECT FILE
106

CODE AND DATA 402

SYMBOL TABLE
404

RELOCATION TABLE 412

GLOBAL REGISTER DATA
STRUCTURE (GRDS)
406

FIGURE 4A

GLOBAL REGISTER DATA STRUCTURE (GRDS) 406

USAGE INFORMATION (UI) 440

INITIALIZATION INFORMATION (II) 441

GLOBAL REGISTER INITIALIZATION ENGINE 119

FIGURE 4B

USAGE INFORMATION (UI)
440

GLOBAL REGISTER NUMBER (GRN)
450

SYMBOL NAME FOR VARIABLE ASSIGNED TO GLOBAL REGISTER
451

FIGURE 4C

INITIALIZATION INFORMATION (II)
441

INITIAL VALUE (IV)
460

FLAGS 461

INITIALIZER PRESENCE INDICATION
471

ABSENCE OF NAME 472

| SYMBOL TABLE | | | | | |
|---|---|---|---|---|---|
| TYPE | VALUE | NAME | SIZE | BINDING | SECTION INDEX |
| TYPE | VALUE | NAME | SIZE | BINDING | SECTION INDEX |

714 (first row), 718 (second row)

| RELOCATION TABLE | | | | |
|---|---|---|---|---|
| OFFSET | REGISTER TYPE | SYMBOL | ADDENT |
| OFFSET | REGISTER TYPE | SYMBOL | ADDENT |

814 (first row), 818 (second row)

FIG. 8

METHODS, COMPUTER PROGRAM PRODUCTS, AND APPARATUS FOR INITIALIZING GLOBAL REGISTERS

RELATED APPLICATIONS

This application is related to commonly-assigned U.S. patent application Ser. Nos. 09/087,352 and 09/087,264, filed on even date hereto, respectively invented by Stephen Chessin, Rod Evans, and Michael Walker; and Stephen Chessin. Each of these related patent applications is hereby expressly referenced, incorporated herein, and made a part hereof.

BACKGROUND OF THE INVENTION

1. Field of the Invention

The field of this invention relates to methods, computer program products, and systems for initializing global registers in connection with the compilation and linking of object files used to develop an executable or library software file or execution image for use in a computer programming system or network.

2. Description of Related Art

The designation of one or more of the computer system registers as global in scope increases operational flexibility in the field of computer systems and software. Local registers, unlike global registers, have a scope limited to the particular module or subroutine. By contrast, global registers are selected registers which are used by a computer program generally and not merely by particular modules or subroutines of the computer program. Global variables or symbols are used in connection with such global registers for general use during execution of the computer program.

Global variables and symbols used in computer programs are typically initialized at the beginning of program execution, to provide initial values for use in routines and algorithms which are implemented during operation. However, while such variables and symbols are conventionally initialized in computer memory, there is a lack of initialization provisions for global registers. When different portions of a particular program use a certain global register which has not properly been initialized, misreferencing and erroneous scoping of variables may occur. Such a lack of initialization of a global register tends to cause incorrect program results, because an erroneous variable value, or no value at all, will be in the global register at the time at which it is accessed.

It is desirable to enable initializing global values incident to software operation. While known mechanisms exist for initializing variables in memory to given values before program execution begins, there are no such known mechanisms for initializing a register that is to contain a global variable which needs to be set to a selected value before execution begins.

SUMMARY OF THE INVENTION

According to the present invention, individually compiled software units are linked into a combined executable file and particular variables are set to predetermined initial values in particular global registers. Static and dynamic linkers perform linking operations respectively to produce executable files and an execution image. Further, global registers are initialized to desired values before program execution begins. According to one embodiment of the present invention, a predetermined portion of a symbol table entry indicates whether or not an initializer is present for a particular global register. According to particular embodiments of the present invention, a relocation type, R_SPARC_REGISTER, or a unitary data structure indicates an initial value for a global register.

Further according to the present invention, a compiler generates symbol table entries to indicate whether a containing object file uses application-reserved global registers and if so, what the initial values of the particular global registers will be. The static linker checks the generated symbol table entries for all object files being combined into a particular target object file, to ensure that the symbol tables contain initial values for at least a substantial number of the global registers referenced by the different source elements and that these initial values are used compatibly. The resulting object file produced includes these symbol table entries to indicate the resulting object file global register usage. The static linker warns if any object file that was referenced during the linking used global registers which are incompatibly initialized or initializable. The static linker generates a warning, if a shared object file is being built that incompatibly initializes a global register.

According to the present invention, a system and method for initializing an executable software file includes a compiler for generating a symbol table which associates particular global registers with certain initial values. The symbol table information is sufficient to enable a linker to perform initialization. The symbol table information is included in the object file generated by the compiler. The compiler particularly generates object files such that identification of usage conflicts and performance of relocation operations relating to failure of initialization are delayed until operation of the linker. A linker links the object file with other object files and shared libraries to thereby generate either an executable file or a shared library which uses pre-initialized global values.

BRIEF DESCRIPTION OF THE DRAWINGS

FIG. 4A is a block diagram of an object file produced by a compiler according to a preferred embodiment of the present invention, in which object files are produced by the compiler with initialization information for the global registers which is used by the run-time linker;

FIG. 4B is a block diagram of a data structure according to one embodiment of the present invention, including usage information and initialization information, to enable provision of initialization information to the global register initialization engine according to the present invention;

FIG. 4C is a block diagram of the protocol for usage information in a data structure according to the present invention;

FIG. 4D is a block diagram of the protocol for initialization information in a data structure according to the present invention;

FIG. 7 is an example of a symbol table generated by a compiler according to a preferred embodiment of the present invention, in which the symbol table information includes indications of symbol type, symbol value, symbol name, size, and binding status establishing whether the symbol represents a local or global variable; and FIG. 8 is a relocation table according to one embodiment of the present invention.

DETAILED DESCRIPTION OF THE PREFERRED EMBODIMENT

Figure 1:
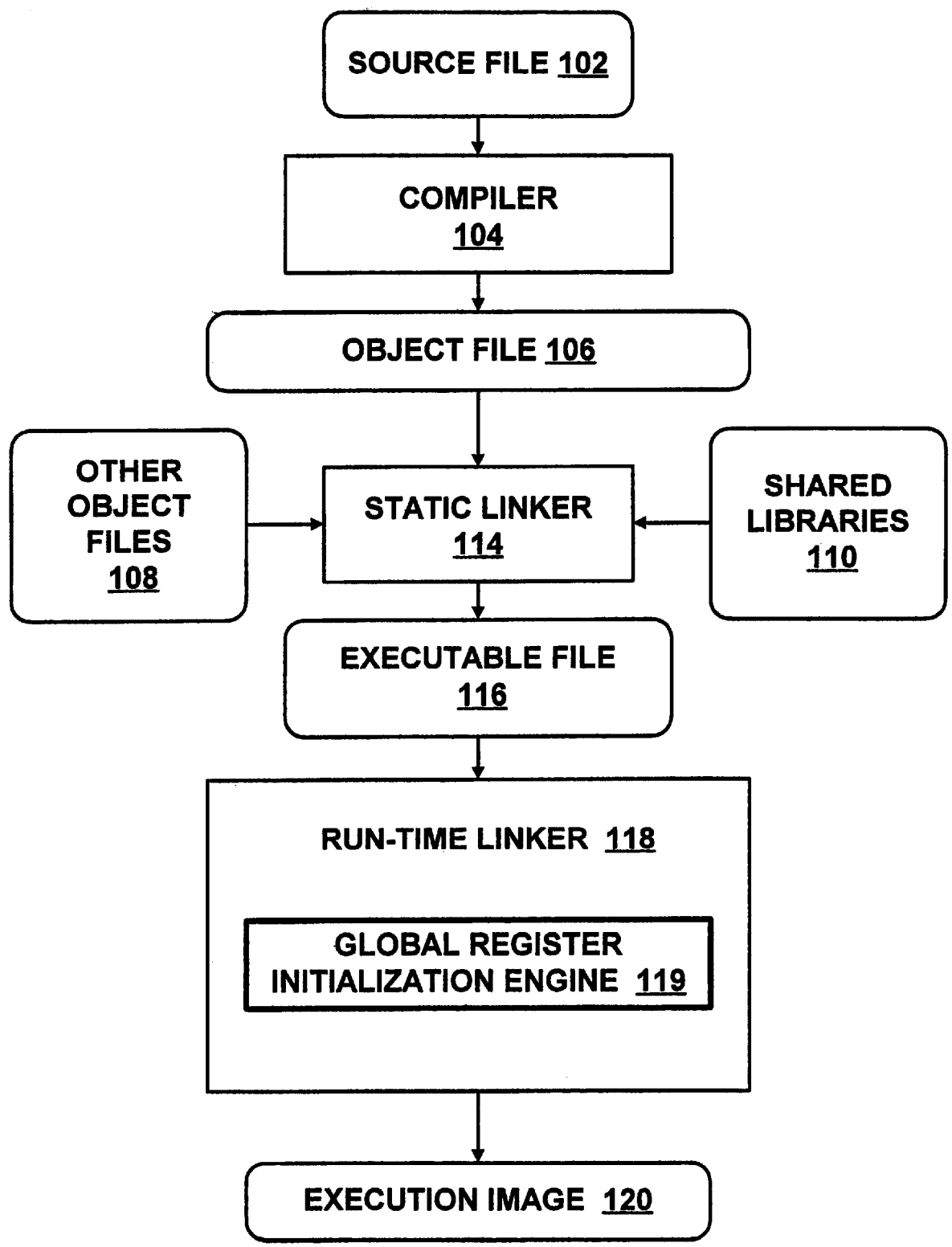
FIG. 1 is a compilation data flow diagram according to a preferred embodiment of the present invention, showing the creation of object files by a compiler, which are joined into an executable file or into an execution image, respectively by a static linker and a run-time linker which features a global register initialization engine which provides initial values for global registers prior to the execution image runs.

FIG. 1 is a compilation data flow diagram according to a preferred embodiment of the present invention, showing the creation of object files by a compiler which include a data structure (DS) to enable determination of conflicts between global register assignments by the static and run-time linkers, and to initialize the global registers. In particular, FIG. 1 illustrates a compiler 104, a static linker 114, and a run-time linker 118, according to one implementation of the present invention. The run-time linker 118 includes a global register initialization engine 119 according to the present invention. The compiler 104 generates an object file 106 including a data structure global register conflict determination according to the present invention, from a source file 102. The source file 102 is written according to different embodiments of the present invention in the well-known C, C++, or the Fortran computer programming languages. It is important to note that the present invention does not impose restrictions on how developers may use the particular language selected to produce the source file 102. According to one embodiment of the present invention, the static linker 114 includes a relocation code section which is used to initialize global register symbols. The data structure has a name, .rela; a type, SHT_RELA; and no attributes, Accordingly, the following table is valid:

TABLE A

Matrix of Legal Combinations of Usage of a Given Register

| Name | Type | Attributes |
|------|------|------------|
| .rela | SHT_RELA | None |

.rela sh_link contains the section header index of the associated symbol table; and sh_info is 0, indicating that this section only contains register relocations.

Figure 2:
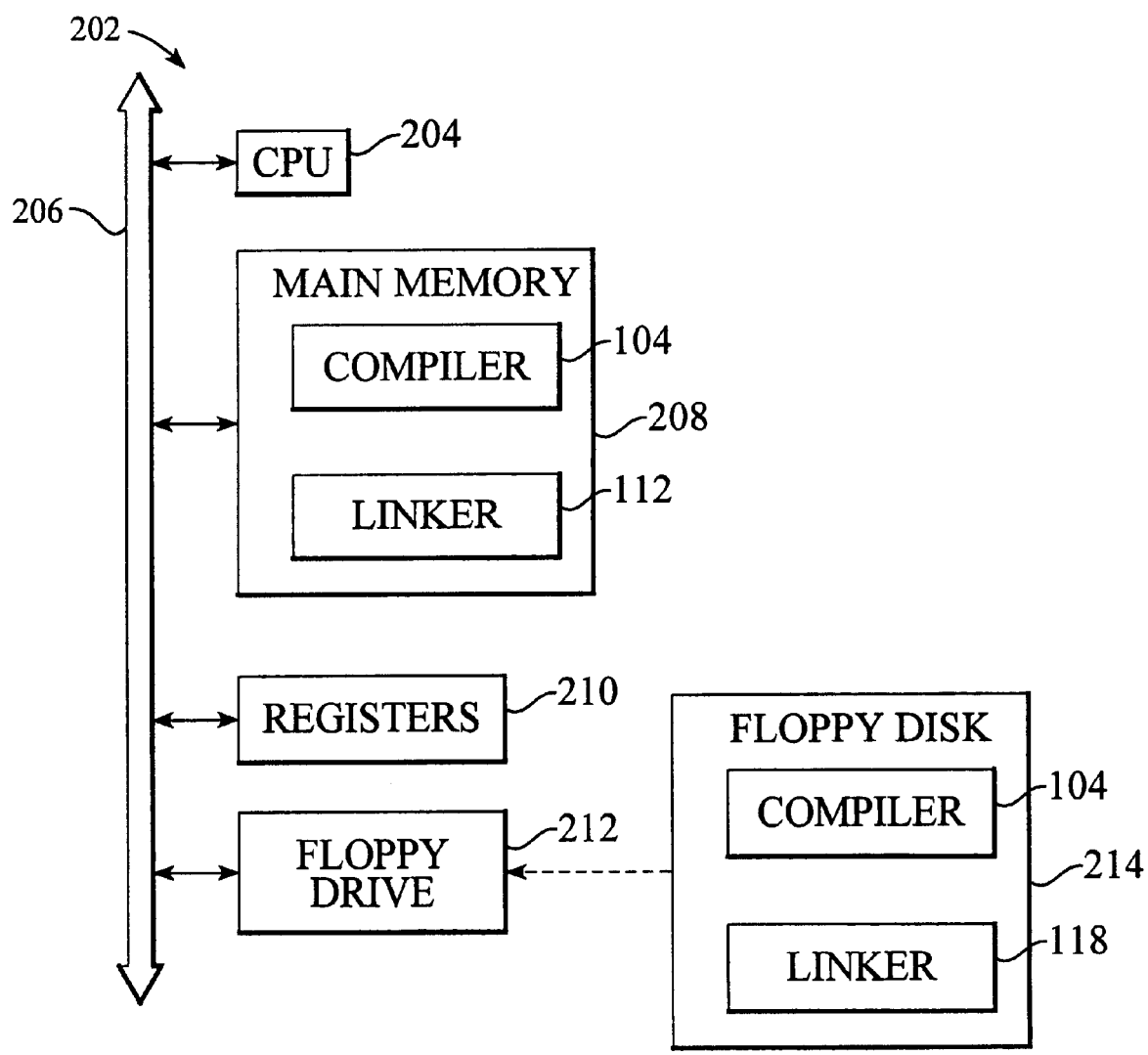
FIG. 2 is a block diagram of a computer system according to a preferred embodiment of the present invention.

The object file 106, as well as zero or more other object files 108, and/or zero or more shared libraries 110 are transferred to a static linker 114, according to one embodiment of the present invention. The other object files 108 were previously compiled by the compiler 104 of the present invention and the shared libraries 110 were previously created by the static linker 114. The static linker 114 generates an executable file 116 or shared library. According to one embodiment of the present invention, the static linker 114 generates another shared library. As will be appreciated, a shared library is a form of an object file. Accordingly, the terms "object file" and "shared library" will be used interchangeably herein. As will be appreciated by persons skilled in the art, the executable file 116 includes code, data, and other information from the object files 106, 108, and also contains references to shared libraries 110 (i.e., code, data, etc. from the shared libraries 110 are not actually embedded in the executable file 204). During run-time, the executable file 116 and the shared libraries 110 are transferred to a run-time linker 118. The run-time linker 118 resolves references contained in the executable file 116 to the shared libraries 110, initializes the global registers with global register initialization engine 119, and produces an execution image 120. The execution image 120 is stored in main memory 208 and executed by a central processing unit 204 (FIG. 2). Generally speaking, the operation of the static linker 114 and run-time linker 118 may be broken down into four phases, as discussed in detail below.

FIG. 2 is a block diagram of a computer system 202 according to a preferred embodiment of the present invention. The computer system 202 includes one or more processors, such as central processing unit (CPU) 204, connected to a communication medium, such as a bus 206. The computer system 202 further includes a main memory (e.g., without limitation a random access memory (RAM)) 208, which is also connected to the bus 206. The computer system 202 further includes a compiler 104 and first and second linkers including a static linker 114 and a run-time linker 118, which are stored in the main memory 208 according to one embodiment. In particular, the source file 102; the object files 106 and 108; the shared libraries 110; and the execution image 120 are also preferably stored in the main memory 208. Computer system 202 further includes registers a plurality of registers 210 including one or more global registers. According to one embodiment of the present invention, a computer program product (such as disk 214) includes a computer readable media having computer program logic recorded thereon, according to the present invention. In particular, the computer logic is executed in the computer system 202 to enable the computer system 202 to perform the functions of the present invention. The computer log is read by a floppy drive 212 for example. The computer program logic, which represents the compiler 104 and the linkers including static linker 114 and run-time linker 118, may then be loaded into the main memory 208 (as shown), and executed by the CPU 204. A suitable form for the computer system 202 is a Sun Microsystems workstation made by Sun Microsystems, Inc., of Mountain View, Calif. Any other suitable computer system could alternatively be used.

Figure 3A:
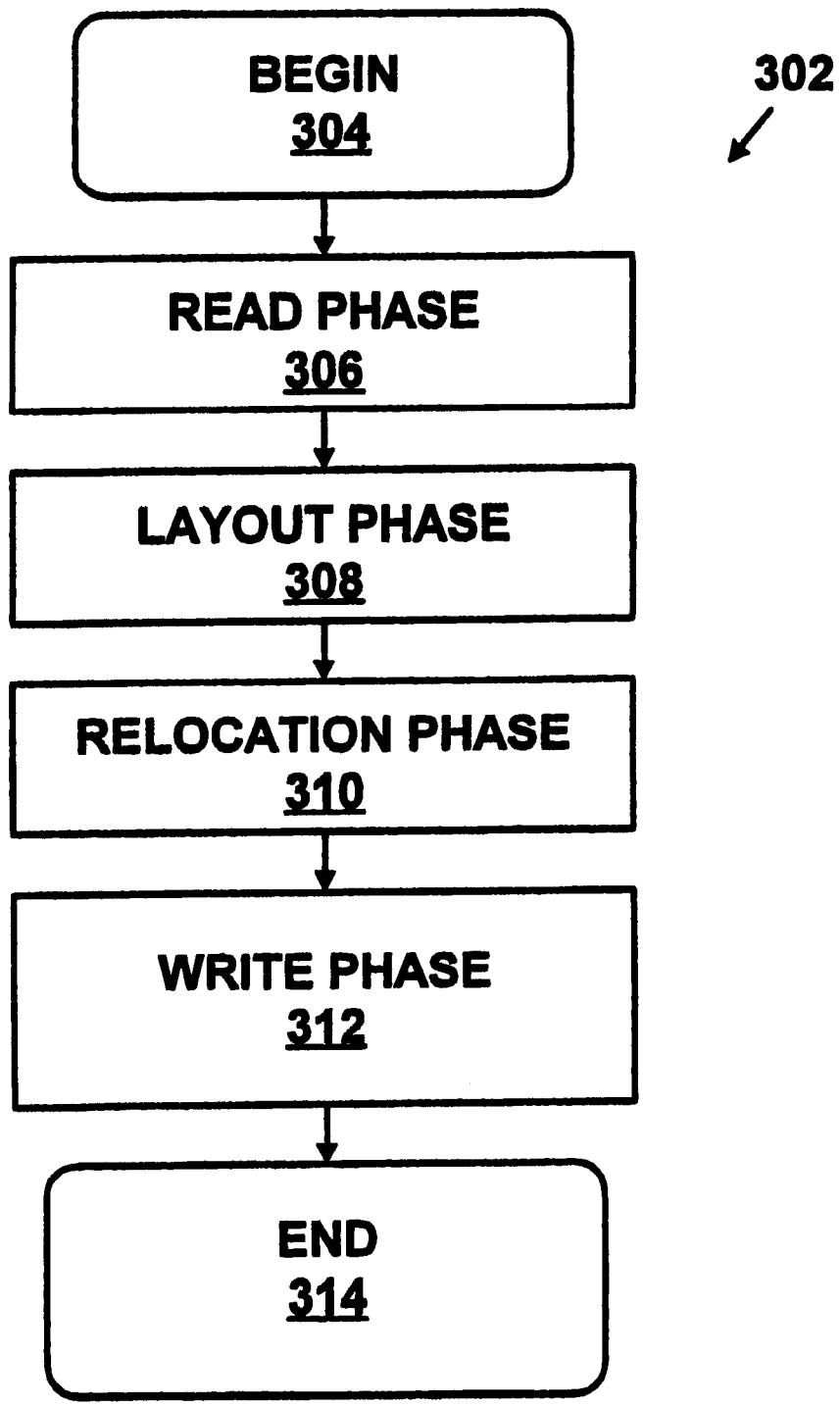
FIG. 3A is a flowchart of a linker process for use in connection with the present invention.

FIG. 3A is a flowchart of a linker process which can be used in connection with the present invention. Referring to a flowchart 302 shown in FIG. 3A, the static linker 114 performs a read phase 306, a layout phase 308, a relocation phase 310, and a write phase 312. These linker phases 306, 308, 310, and 312 are performed in connection with the present invention.

Figure 3B:
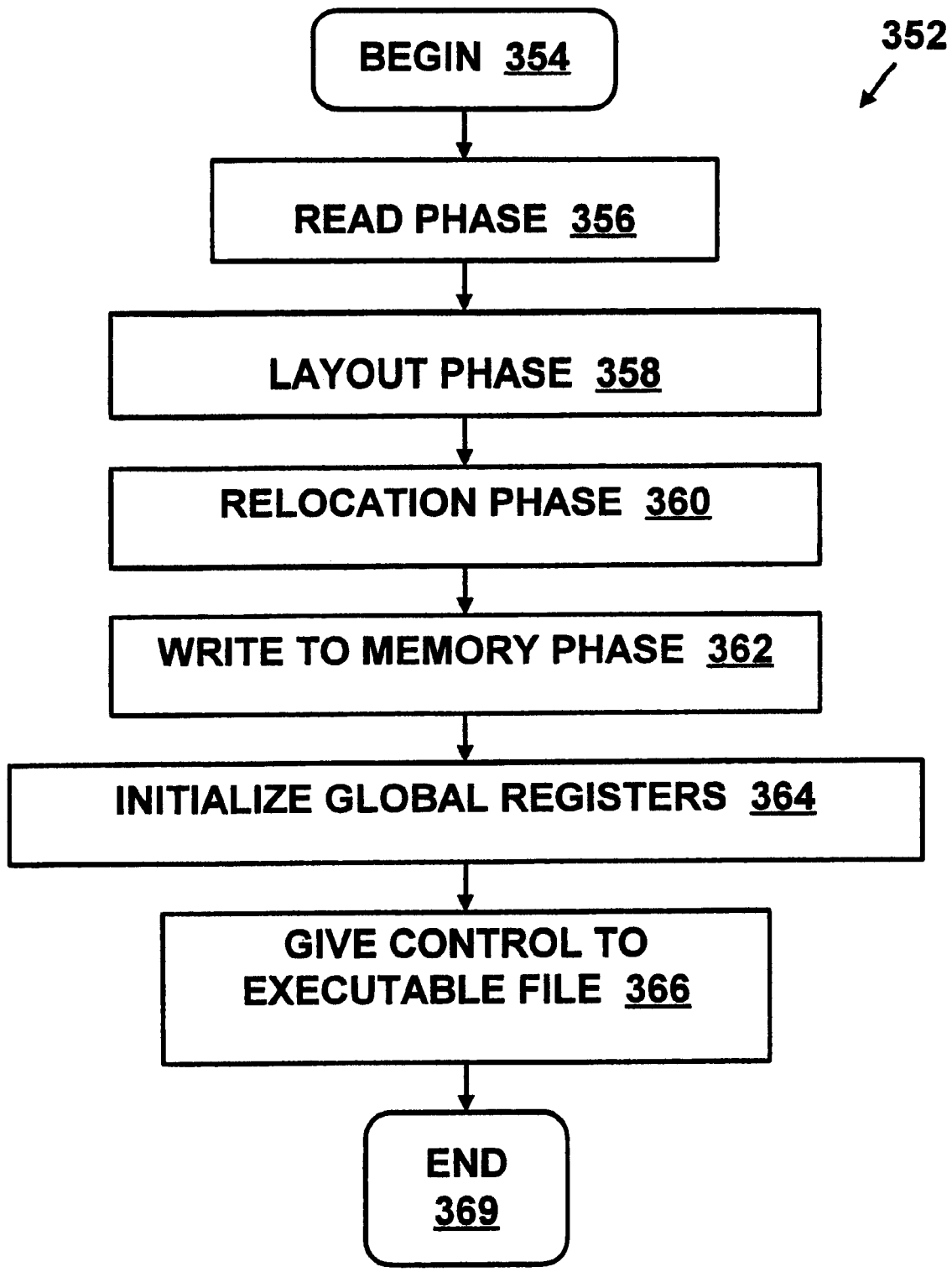
FIG. 3B is a flowchart of a linker process according to one embodiment of the present invention which includes initialization of global registers.

FIG. 3B is a flowchart of a linker process according to one embodiment of the present invention which includes initialization of global registers. In particular, referring to a flowchart 302 shown in FIG. 3B, the run-time linker 118 performs a read phase 306, a layout phase 308, a relocation phase 310, a write to memory phase 312, an initialization of global registers phase 364 according to the present invention, and a give control to the executable file phase 366, followed by a termination or end of execution state 369.

Figure 3C:
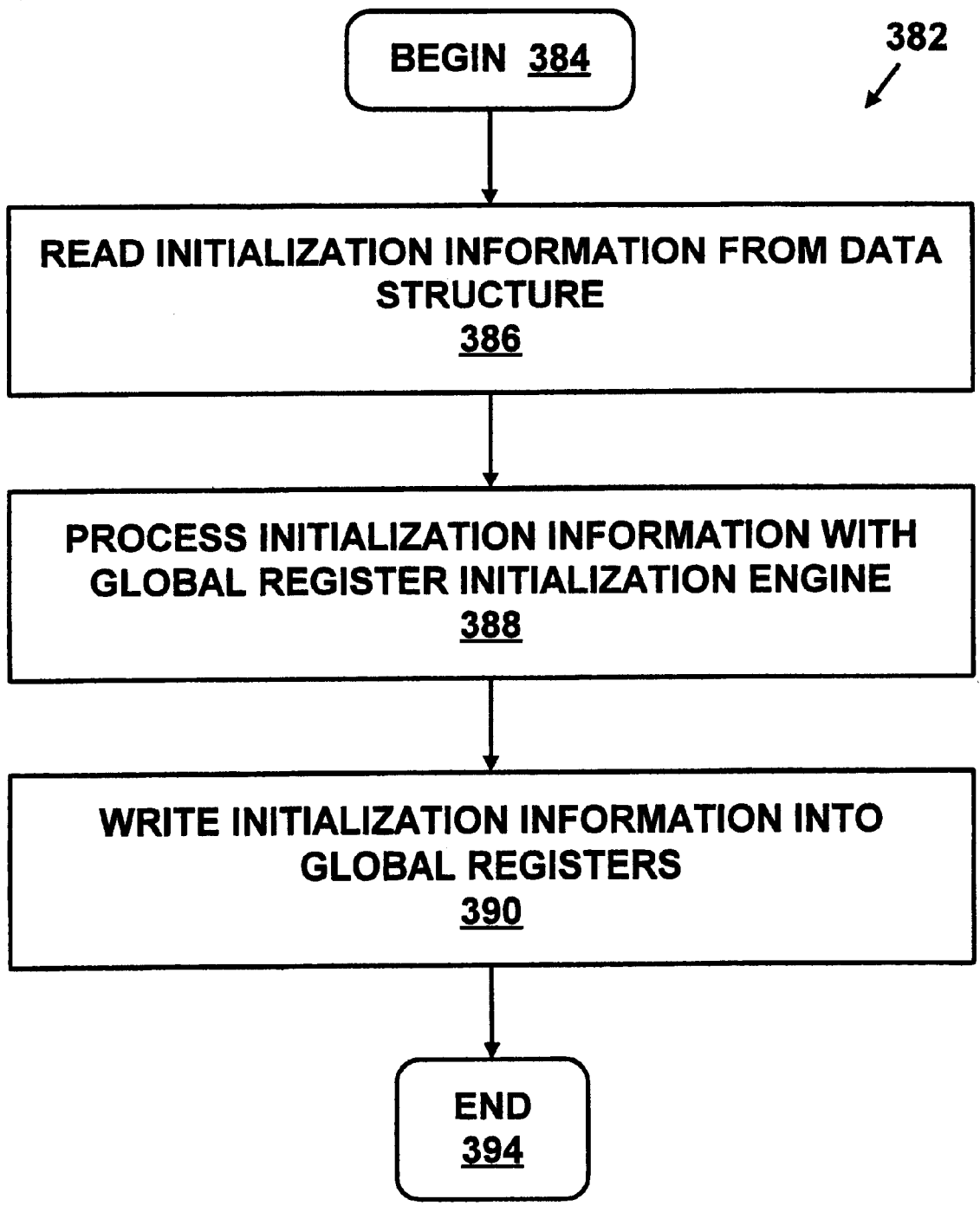
FIG. 3C is a flow chart of global register initialization according to the present invention.

FIG. 3C is a flow chart of global register initialization according to the present invention. In particular, FIG. 3C shows an initialization process 382 according to one embodiment of the present invention. Initialization includes reading 386 initialization information from a data structure according to the present invention, which contains initialization information for predetermined global registers. According to one embodiment of the present invention, the data structure is a symbol table. According to another embodiment of the present invention, the data structure is a unitary data structure as shown in the related application entitled "Unitary Data Structure Systems, Methods, and Computer Products, for Global Conflict Determination," which is expressly incorporated herein in its entirety by reference. Initialization additionally includes processing 388 of the initialization information which has been read, using the global register initialization engine (GRIE) according to the present invention. Further, initialization includes writing 390 the processed initialization information into predetermined global registers. Finally, initialization is completed 394.

FIG. 4A is a block diagram of an object file produced by a compiler according to a preferred embodiment of the present invention, in which object files are produced by the compiler with a global register data structure (GRDS) 406 to enable determination of conflicts between global register assignments by the static and run-time linkers. As shown in FIG. 4A, the object file 106 includes code and data 402, a symbol table 404, a relocation table 412, and GRDS 406 according to the present invention. The manner in which the compiler 104 generates such code and data 402, the symbol table 404, and the relocation table 412, will be apparent to persons skilled in the relevant art. In accordance with the present invention, the compiler 104 does not identify global symbol conflicts, or perform relocations. Instead, the compiler 104 generates global symbol and global register information, and embeds such information in a global register data structure (GRDS) 406 which in turn is contained in the object file 106. Such global symbol and global register information includes information about global symbols and global registers defined and/or referenced in the source file 102, and includes additional information on how such global symbols and global registers are used by the source file 102. The global symbol and global register information 406 generated by the compiler 104 enables the linker 112 to identify global symbol conflicts and global register conflicts and to perform relocations to associate symbols with memory locations and global registers, as the case may be. The global register data structure (GRDS) 406 is further described below.

FIG. 4B is a block diagram of a GRDS 406 according to one embodiment of the present invention, including usage information (UI) 440 and initialization information(II) 441, to enable determination of conflicts between global register assignments by the static and run-time linkers. GRDS 406 communicates with global register initialization engine (GRIE) 119 to enable global register initialization with initialization information 441 according to the present invention.

FIG. 4C is a block diagram of the protocol for UI 440 in GRDS 406 according to the present invention. In particular, the UI protocol includes a global register number (GRN) 450 and global symbol information (GSI) 451.

FIG. 4D is a block diagram of the protocol for II 441 in a GRDS 406 according to the present invention. In particular, the II 441 includes an initial value (IV) for each global register, as well as flags 461 to provide an initializer presence indication 471 and an indication of the absence of a name 472. As discussed above, the compiler 104 does not identify global symbol conflicts or perform relocations. Instead, identification of global symbol conflicts is delayed from compile time to link time. In step 506 of FIG. 5, the compiler 104 generates information about global symbols and how they are used. Such information is called symbol information 406, and is embedded in the object file 106 produced by the compiler 104.

Figure 5:
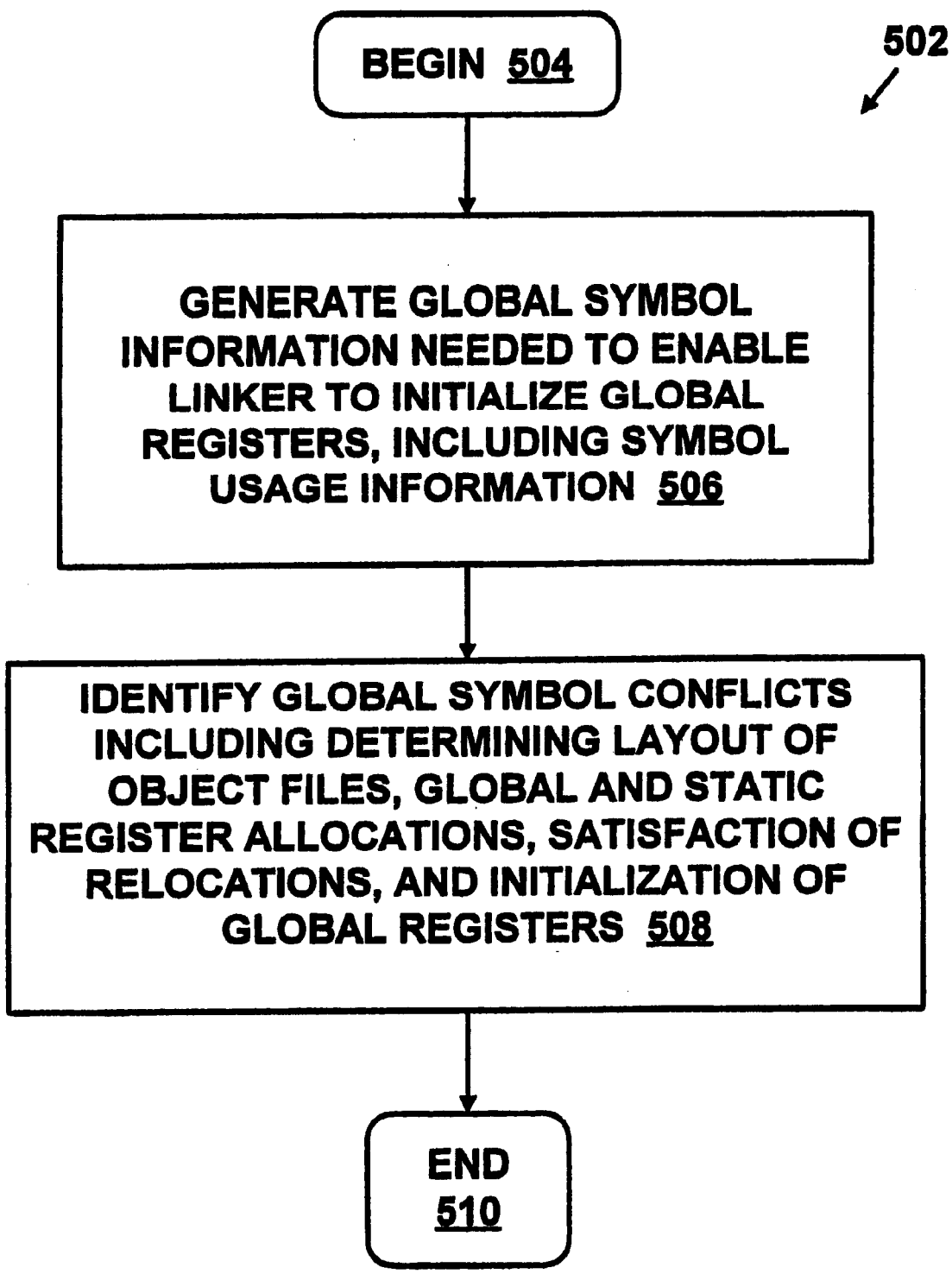
FIG. 5 is a flowchart of a compilation/linking process according to a preferred embodiment of the present invention.

FIG. 5 is a flowchart of a compilation/linking process according to a preferred embodiment of the present invention. In particular, FIG. 5 depicts a flowchart 502 according to the present invention which represents the high-level operation of the compiler 104 and the applicable one of linkers 114, 118. The compiler 104 performs step 506 when compiling the source file 104, and the applicable one of linkers 114, 118 performs step 508 when processing the object files 106 and 108, and the shared libraries 110. Flowchart 502 begins with step 504, where control passes to step 506. The compiler generates global symbol table entries to indicate how the containing object file uses the application-reserved global registers. The programmer indicates to the compiler by flags, for example, according to one embodiment of the present invention, or to the assembler by flags or directives according to one embodiment of the present invention, what the global register usage is. In step 506, the compiler 104 generates an object file 106 from the source file 102. In step 508, the applicable one of linkers 114, 118 generates an executable file 116, and then an execution image 120 from the object files 106 and 108, and the shared libraries 110. As discussed above, during the generation of the executable file 116 and the execution image 120, the static linker 114 and the run-time linker 118 perform a read phase 306, a layout phase 308, a relocation phase 310, and a write phase 312. According to the present invention, these linker phases 306, 308, 310, and 312 are modified such that the static linker 114 and the run-time linker 118 identify global symbol conflicts and perform relocations. The operation of the static linker 114 and the run-time linker 118 is further discussed below. After step 508 is fully performed, the operation of flowchart 502 is complete, as indicated by step 510. The static linker checks these symbol table entries in all the object files being combined into an executable file or shared library to ensure that the global registers are used compatibly. The resulting object includes, according to the present invention, entries in its symbol table to indicate the resulting object's global register usage. The static linker warns if any shared library that was referenced during the linking uses global registers in a fashion incompatible with the object being built. Further according to the present invention, the static linker generates a warning if a shared object is being built that uses application-reserved global registers. The dynamic linker according to the present invention checks that all object files being bound into the target process have compatible uses of the application-reserved global registers. A dlopen( ) of an object that is not compatible with the application process, for example, fails with an error.

TABLE B

Matrix of Legal Combinations of Usage of a Given Register

| Obj1\Obj2 | Unused | Scratch | Symbol |
|---|---|---|---|
| Unused | OK | OK | OK |
| Scratch | OK | OK | NO |
| Symbol | OK | NO | * |

*OK is used if the symbols are identical; NO is used if they are not identical. Two symbols are identical if and only if one of the following is true:
A. They are both global and have the same name.
B. They are both local, have the same name, and are defined in the same object.

The scratch symbol according to the present invention is treated as a symbol since a null name only matches a null name and scratch registers according to the present invention have global scope.

A matrix of legal combinations of st_shndx for the same register symbol follows:

TABLE C

Matrix of Legal Combinations of Initialization of a Given Register

| Obj1\Obj2 | UNDEF | ABS |
|---|---|---|
| UNDEF | OK | OK |
| ABS | OK | NO |

The symbol information 406 includes according to one embodiment of the present invention:

1. a symbol table 408 containing a list of global symbols; and
2. a relocation table 412 containing a list of global symbols.

Using the symbol information 406, the linker 114 or 118 as applicable in step 508 determines the exact layout of global symbol used by an application and then satisfies the relocations required. The symbol table 408 comprises a plurality of entries, where each entry corresponds to a symbol. These entries are used by the linkers 114 and 118 during the relocation process.

Figure 6:
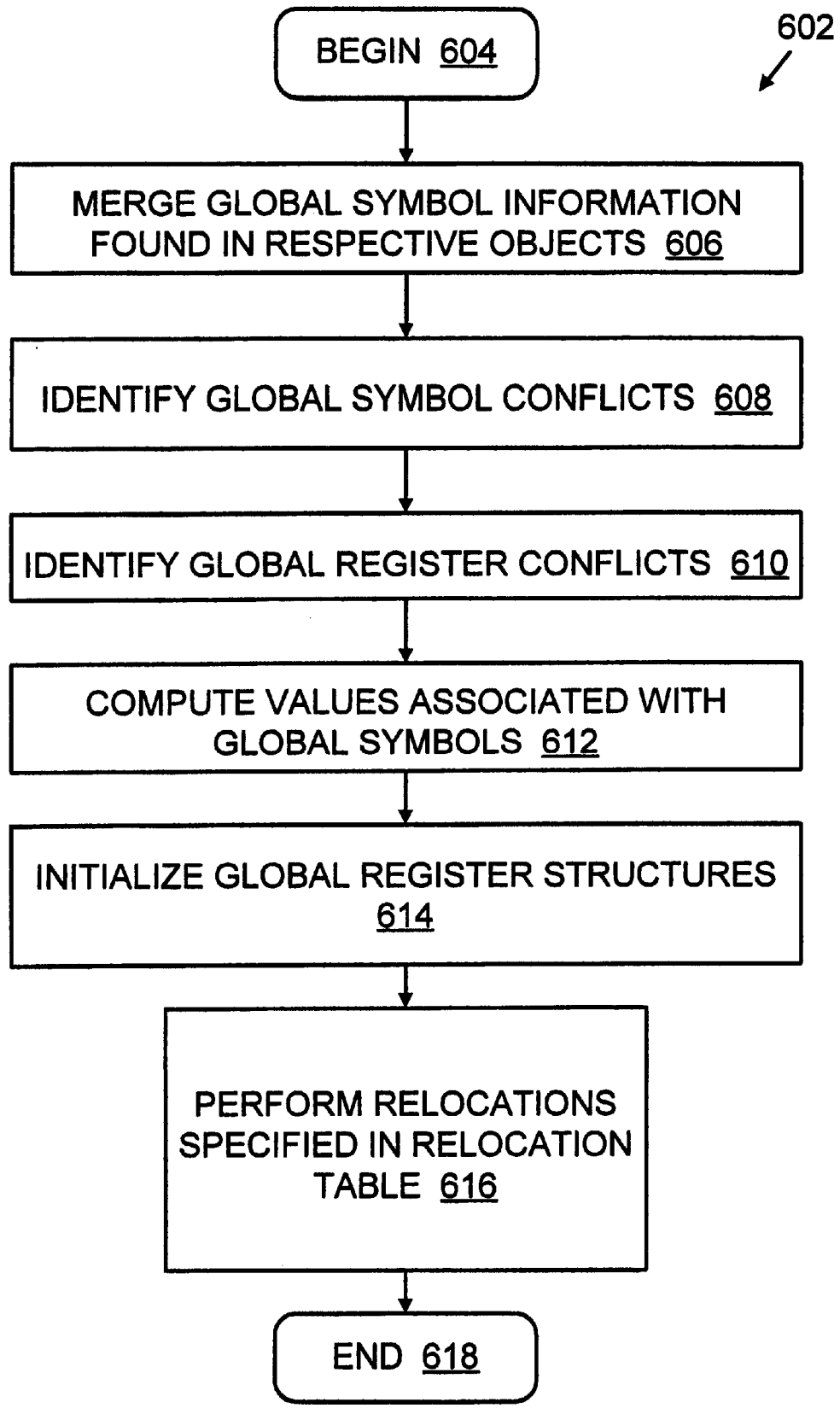
FIG. 6 is a detailed flowchart of link processing according to a preferred embodiment of the present invention.

FIG. 6 is a detailed flowchart of link processing according to a preferred embodiment of the present invention. FIG. 6 is a detailed flowchart of a linker which generally can be broken down into four phases: a read phase 306, a layout phase 308, a relocation phase 310, and a write phase 312 as noted above with respect to FIG. 3. According to the present invention, these linker phases 306, 308, 310, and 312 are restructured such that the applicable linker identifies global symbol conflicts based upon information contained in one or more of the unitary data structures (UDSs) 406. Such modifications are shown in a flowchart 602 which is represented in FIG. 6. In particular, step 606 is preferably performed in the read phase 306 in order to merge the global symbol information found in selected objects. Step 608 of the linker operation is preferably performed between the read phase 306 and the layout phase 308, accomplishing the identification of global register conflicts. Steps 612 and 614 are preferably performed between the layout phase 308 and the relocation phase 310 during operation of the applicable linker. Step 616 relates to relocations to modified memory addresses or global registers, and is preferably performed during the relocation phase 310. Flowchart 602 shall now be described in greater detail. Flowchart 602 particularly begins with step 604, where control immediately passes to step 606 to accomplish merger of global symbol information. In step 606, the applicable linker reads in the object files 106, 108 and the shared libraries 110 and merges together the global symbol information 406 contained in the UDS 406. Further, the applicable linker merges together the UDS 406 contained in these files to generate a merged UDS. Similarly, the applicable linker merges together the relocation tables 412 to generate a merged class relocation table. Next in step 608, the applicable linker identifies global symbol conflicts. In particular, the applicable linker processes the merged tables and determines the layout of each symbol (for example, the size and alignment of each symbol, the number of fields, the data types of the fields, the number of bytes from the top of the symbol to each of the fields, etc.). The applicable linker particularly creates a separate data structure for each symbol, and stores this symbol specific information in such separate data structures. These data structures are called "layout data structures" for reference purposes. Upon the completion of step 608, the applicable linker is aware of much of the symbol-related information produced by a compiler. According to step 610, global symbol conflicts are identified. In step 612, the applicable linker evaluates the symbols in the merged UDS. In particular, the applicable linker determines the value of the symbol in each entry of the merged symbol table, and stores this value in the value field of this entry. Consider, for example, the example UDS 406 in FIG. 4B. The applicable linker determines the values of particular entries by referencing an associated layout data structure. The applicable linker stores these values in the value fields of the entries of the UDS 406 which is contained in UI 440 of UDS 406. The manner in which the linker 112 calculates the values of other symbol types is described above. In step 614, the applicable linker initializes global register structures. In particular, during step 614 the applicable linker generates tables and table pointer information tables including UDSs 406, and stores these tables in the appropriate data structures that have been allocated. In step 616, the applicable linker performs the relocations specified in the entries of the merged relocation table. The manner in which the applicable linker performs this function is described above. After step 616 is fully performed, the operation of flowchart 602 is complete, as indicated by step 618. As will be appreciated by persons skilled in the relevant art, the operation of the applicable linker described above is, in practice, collectively performed by the static linker 114 and the run-time linker 118. Whether the operations described above are performed by the static linker 114 or the run-time linker 118 is not important in the present invention. Preferably, however, the static linker 114 attempts to prelink executables and shared objects so that if the executable and shared objects are in the same state as when they were created, then the run-time linker 118 needs to only load the files and start running. In practice, the run-time linker 118 may have to redo many of the relocations that were done by the static linker 114.

FIG. 7 is an example of a symbol table generated by a compiler according to a preferred embodiment of the present invention. FIG. 7 particularly shows first and second symbol table entries, 714 and 718, in an example symbol table 408. Each entry in the symbol table 408 includes information that identifies the symbol type, and information that indicates the value of the symbol for this class. Entries for particular symbols may additionally include further fields including for example symbol name, symbol size, symbol binding, and a symbol section index. The symbol name when appropriate contains the name of a member. The list of symbol types is implementation specific, and depends on a number of factors, such as the computer programming language and the target machine. Example symbol types will be apparent to persons skilled in the relevant art.

As described below, the applicable linker calculates the values of the symbols in the symbol table 408 according to the present invention before processing the relocation entries in the relocation table 412. In processing each relocation entry, the value is extracted from the symbol table and is stored at the given address according to the type of the relocation entry. Consider the example of FIG. 7. Prior to processing the relocation entries in the relocation table 412, the applicable linker evaluates the symbol entries 714, 718 in the symbol table 408 and reads the value associated with each symbol entry. The applicable linker then inserts the value read into the value field of the symbol entry 714. According to one embodiment of the present invention, the applicable linker inserts this value (8 bytes) into the value field of the symbol entry 718. While processing a particular relocation entry, the applicable linker according to the present invention replaces a placeholder in the instruction at a particular address with the value in symbol entry 714. This may be a case pointer in a relocation entry which points to symbol entry 714. Similarly, while processing a particular relocation entry for relocation table 412, the applicable linker replaces the placeholder, such as a zero (i.e., "o" for example) in the instruction at a particular address with the value provided in symbol entry 714. A register symbol in a symbol table according to one embodiment of the present invention is indicated by a specific additional Symbol Type and Value as set forth below:

TABLE D

Additional Symbol Table Type

| Name | Value |
|---|---|
| STT_REGISTER | 13 |

A symbol table entry for a register symbol according to one embodiment of the present invention particularly includes the following elements:

| | |
|---|---|
| st_name | Index into the string table of the name of the symbol. An index value of 0, which points to the null name in the string table, indicates that the register is used for scratch. A scratch register must have binding STB_GLOBAL. |
| st_value | Register number. Register numbers correspond to the assignments in the SPARC Architecture Manual for integer registers. |
| st_size | unused (0) |
| st_info | ELF64_ST_INFO (bind.type) bind is typically STB_GLOBAL, but does reflect the actual declared scope of the name (that is, it could be STB_WEAK or STB_LOCAL). type must be STT_REGISTER (13) |
| st_other | unused (0) |
| st_shndx | SHN_ABS if this object initializes this register symbol; SHN_UNDEF otherwise. An initializer for a SHN_ABS register symbol is specified with a special register relocation type. |

Absence of an entry for a particular global register indicates that that particular global register is not used by the object. An object according to the present invention uses one or more of the application-reserved global registers and indicates this usage with an appropriate symbol-table entry. The following dynamic array tag is moreover added to the symbol table according to one embodiment of the present invention:

TABLE E

Symbol Table Dynamic Array Tags

| Name | Value | d_un | Executable | Shared Object |
|---|---|---|---|---|
| DT_REGISTER | 0 x 7000001 | d_val | optional | optional |
| DT_REGISTER | This element contains the index of an STT_REGISTER symbol. There is one of these entries for every STT_REGISTER symbol table entry in the symbol table. | | | |

The compiler 104 according to the present invention accordingly generates code that is relocated at link-time. In particular, if a variable is referenced in a source file, the compiler 104 generates both a symbol table 408 and a relocation table 412. According to one embodiment of the present invention, the generation of symbol and relocation tables is accomplished with a specialized global register relocation type which is used to identify global register conflicts and to initialize the global registers prior to execution of the execution image which is produced.

FIG. 8 is an example of a relocation table according to one embodiment of the present invention. The relocation table 412 contains a list of the relocations which must be performed by the applicable linker during link-time. Each entry in the relocation table 412 includes a relocation type, an address of either an instruction or a data element that needs to be relocated, and, in all but one case, a pointer to an entry in the symbol table 408. The following relocation type is added to the relocation table according to the present invention:

TABLE F

Additional Relocation Type

| Name | Value | Field | Calculation |
|---|---|---|---|
| R_SPARC_REGISTER | 54 | V-xword64 | S + A |
| R_SPARC_REGISTER | This relocation type is used to initialize a register symbol. Its offset member contains the register number to be initialized. There must be a corresponding register symbol for this register of type SHN_ABS. | | |

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of initialization of a global register comprising:

generating, by a compiler, global register information pertaining to at least a single global variable referenced in a source file;

generating, by said compiler, an object file from said source file, said object file comprising said global variable information, while not identifying global symbol conflicts, and not performing relocations; and linking, by a linker, said object file with at least one of another object file and a shared library to thereby generate an executable file, using said global variable information contained in said object file to initialize at least a single global register and to identify variable conflicts with respect to said at least a single global register, the linker warning if any shared library that was referenced during the linking uses global registers in a fashion incompatible with an object being built.

2. The method according to claim 1, including generating a data structure within a selected object file, containing global register initialization values.

3. The method according to claim 2 comprising:

selecting such a global register;

determining an initial value of a selected global register; and storing said value in a field of such a data structure linked to the global register.

4. The method according to claim 3, further comprising creating a data structure within a selected object file, to enable initialization of global registers.

5. The method according to claim 1 including determining initial values for global registers in accordance with user requirements.

6. A system for initializing global registers, comprising:

a compiler, comprising an information generator configured to generate initial value information pertaining to global registers referenced in said source file, while not identifying global symbol conflicts, and not performing relocations, said information permitting initialization of global registers during link-time;

an object file generator configured to generate an object file from said source file, said object file comprising a data structure enabling initialization of global registers; and a linker for linking said object file with at least one of another object file to generate an executable file, said linker comprising means for using said symbol information contained in said object file, and said linker warning if any shared library that was referenced during the linking uses global registers in a fashion incompatible with an object being built.

7. The system according to claim 6, further comprising means for generating a data structure comprising a symbol entry for an applicable symbol associated with a reference in a source file, and a value field comprising a value of said symbol type.

8. The system according to claim 7, wherein said system comprises:

means for determining a value of a symbol type; and means for storing said value in said value field of said selected symbol entry.

9. The system according to claim 8, comprising means for generating a data structure enabling initialization of global registers.

10. The system according to claim 9, wherein said system comprises means for initialization of global registers.

11. A computer program product comprising a computer readable medium having computer program logic recorded thereon for enabling a computer system to compile a source file, said computer program product comprising:

a mechanism for enabling said computer system to generate, during compile-time, information pertaining to global registers referenced in said source file, said information enabling initialization of global registers during link-time, while not identifying global symbol conflicts, and not performing relocations;

an object file generating mechanism for enabling said computer system to generate, during compile-time, an object file from said source file; and a linking mechanism for enabling said computer system to link, during link-time, said object file with at least one of another object file to thereby generate an executable file, the linking mechanism warning if any shared library that was referenced during the linking uses global registers in a fashion incompatible with an object being built.

12. A computer system, comprising:

a processor; and a controller for enabling said processor to compile and link a source file, said controller comprising:

a symbol information mechanism for enabling said processor to generate, during compile-time, information pertaining to global registers referenced in said source file, said symbol information enabling initialization of global registers during link-time, while not identifying global symbol conflicts, and not performing relocations;

object file generator for enabling said processor to generate, during compile-time, an object file from said source file, said object file comprising a data structure for enabling initialization of global registers at link time; and a linker for enabling said processor to link, during link-time, said object file with at least one of another object file, the linker warning if any shared library that was referenced during the linking uses global registers in a fashion incompatible with an object being built.

13. A controller for enabling a processor to compile a source file, said controller comprising:

information generating means for enabling said processor to generate, during compile-time, information pertaining to global symbols referenced in said source file, said information being sufficient to enable initialization of global registers during link-time, while not identifying global symbol conflicts, and not performing relocations;

object file generating means for enabling said processor to generate, during compile-time, an object file from said source file, said object file comprising a data structure for enabling initialization of global registers at link time; and linking means for enabling said processor to link, during link-time, said object file with at least one of another object file to thereby generate an executable file, said linking means comprising means for using said information contained in said object file to initialize said global registers, the linking means warning if any shared library that was referenced during the linking uses global registers in a fashion incompatible with an object being built.

14. A system for initializing global registers, comprising:

a compiler, comprising information generating means for generating initial value information pertaining to global registers referenced in said source file, said information permitting initialization of global registers during link-time, while not identifying global symbol conflicts, and not performing relocations;

object file generating means for generating an object file from said source file, said object file comprising a data structure enabling initialization of global registers; and a linker for linking said object file with at least one of another object file to generate an executable file, said linker comprising means for using said symbol information contained in said object file, the linker warning if any shared library that was referenced during the linking uses global registers in a fashion incompatible with an object being built.

15. The method according to claim 1 wherein:

the linker including a static linker and a dynamic linker;

the static linker generates a warning if a shared object is being built that uses application-reserved global registers; and the dynamic linker checks that all object files being bound into the target process have compatible uses of application-reserved global registers.

16. The method according to claim 15 wherein:

the static linker checks these symbol table entries in object files being combined into an executable file or shared library to ensure that the global registers are used compatibly.

17. The method according to claim 1 wherein:

global symbol and global register information includes information about global symbols and global registers defined and/or referenced in the source file.

18. The method according to claim 1 wherein:

identification of global symbol conflicts is delayed from compile time to link time, so that the compiler does not identify global symbol conflicts or perform relocations.

19. The system of claim 6 comprising:

the linker including a static linker and a dynamic linker;

the static linker generates a warning if a shared object is being built that uses application-reserved global registers;

the static linker checks these symbol table entries in object files being combined into an executable file or shared library to ensure that the global registers are used compatibly; and the dynamic linker checks that all object files being bound into the target process have compatible uses of application-reserved global registers.

20. The method according to claim 19 wherein:

global symbol and global register information includes information about global symbols and global registers defined and/or referenced in the source file; and identification of global symbol conflicts is delayed from compile time to link time, so that the compiler does not identify global symbol conflicts or perform relocations.

* * * * *